United States Patent Office 2,830,066
Patented Apr. 8, 1958

2,830,066

SEPARATION PROCESS FOR TRANSURANIC ELEMENT AND COMPOUNDS THEREOF

Lawrence B. Magnusson, Richmond, Calif., assignor to the United States of America as represented by the United States Atomic Energy Commission No Drawing. Application December 31, 1947
Serial No. 795,144

31 Claims. (Cl. 260—429.1)

This invention relates to compounds of neptunium and to a process for the separation of neptunium from aqueous solutions and more especially it relates to the separation of neptunium from plutonium, uranium, and fission products.

The present invention also relates to the extraction of neptunium from an organic solvent solution.

It has recently become known that various isotopes of neptunium, the transuranic chemical element having an atomic number of 93 and the symbol Np, can be prepared by a number of different nuclear processes. For example, it is known that neptunium can be produced in small quantities using a cyclotron for the bombardment of natural uranium with neutrons as follows:

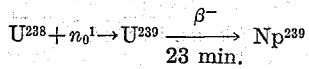

This isotope of neptunium has a half-life of 2.33 days and by beta decay is converted to the plutonium isotope $Pu^{239}$.

In addition to the production of neptunium and plutonium by neutron bombardment of uranium using a cyclotron, neutronic reactors have been developed for the production of neptunium, plutonium, and desirable fission products from natural uranium by a self-sustaining chain reaction. One of the isotopes of uranium occurring in natural uranium is $U^{235}$ and it is present in the amount of 0.71% by weight. When this isotope is bombarded by slow neutrons, preferably of thermal energies, it undergoes fission and releases on an average about two neutrons per fission, in addition to producing fission fragments of relatively low atomic weights. The main constituent of natural uranium, namely, $U^{238}$, absorbs thermal neutrons to produce $Np^{239}$ and $Pu^{239}$ as described above. Heavier isotopes of plutonium are also produced when $Pu^{239}$ absorbs a neutron to produce $Pu^{240}$, which can absorb a neutron to produce $Pu^{241}$. $Pu^{239}$ and $Pu^{240}$ can undergo fission by bombardment with slow neutrons as does $U^{235}$ and likewise they produce on an average two neutrons per neutron absorbed when fission occurs. Thus, in a natural-uranium neutronic reactor the excess neutrons that are released by fission are sufficient to maintain a production of plutonium through neutron absorption by the predominant uranium isotope $U^{238}$. However, the concentration of plutonium thus produced is generally small, rarely being above 1% by weight of the uranium and usually being substantially below this concentration. Thus, it is necessary to recovery plutonium and fission products from uranium masses having plutonium and fission product concentrations below one part per thousand parts and even one part per million parts of uranium.

As mentioned above, during neutron-irradiation of uranium there is produced in addition to the transuranic elements, Np and Pu, other elements of lower atomic weight, known as fission fragments. These radioactive fission fragments are composed of two distinct groups of elements, namely, a light element group and a heavy element group. The light element group contains elements having atomic numbers between about 35 and 46 and the heavier element group have atomic numbers between about 51 and 60. The elements of both of these groups as originally produced, being considerably overmassed and underchanged, are highly unstable. By means of beta radiation they quickly transform themselves into isotopes of other elements having longer half-lives. The fission fragments and the resulting decay products are collectively known as fission products.

The various radioactive fission products have half-lives that range from a fraction of a second to thousands of years. Those having very short half-lives may be substantially eliminated by aging the neutron-irradiated material for a reasonable period of time before further processing. Those radioactive fission products having very long half-lives do not have a sufficiently intense radiation to endanger personnel protected by moderate shielding. On the other hand, the radioactive fission products that have half-lives ranging from a few days to a few years have dangerously intense radiations which cannot be eliminated by aging for practical storage periods. The fission products are chiefly the radioactive isotopes of Sr, Y, Zr, Cb, and Ru of the light group and Te, I, Cs, Ba, La, Ce, and Pr of the heavy group.

The material from the neutronic reactor contains an amount of fission product that is about the same order of magnitude as the amount of plutonium present. In order to recover the plutonium, it is necessary to separate it from large masses of uranium and from a large number of elements having lower molecular weights.

During the operation of the neutronic reactor, i. e., a chain-reacting uranium-graphite pile, another isotope of neptunium, namely $Np^{237}$, is produced. It is an alpha-emitter with a half-life of about $2.2 \times 10^6$ years. By aging of the irradiated uranium, the concentration of $Np^{239}$, since it has a half-life of 2.33 days, becomes very small. Some processes have been developed for separating plutonium from uranium and the waste solutions from these processes contain neptunium, uranium, and fission products. Other processes have been developed that separate plutonium and neptunium from uranium and fission products.

It is an object of the present invention to provide new compounds of neptunium.

A second object of this invention is to separate neptunium from its aqueous solution.

A third object of the present invention is to separate neptunium from aqueous solutions containing neptunium, uranium, and fission products.

Another object of this invention is to separate neptunium from an aqueous solution containing neptunium and plutonium.

A further object of the present invention is to separate neptunium from an organic solvent solution containing neptunium.

Other objects of this invention will be apparent from the description which follows.

I have found that a suitable separation of neptunium from an acidic aqueous solution of a tetravalent neptunium salt can be made by contacting the aqueous solution with a certain type of chelating agent, alone or as an organic solvent solution, to form a neptunium chelate compound. When the organic solvent is present the neptunium chelate compound is extracted; otherwise, it precipitates from the aqeous solution and is separated by filtration or other suitable means.

The chelating agent of the present invention is a fluorinated β-diketone having the general formula:

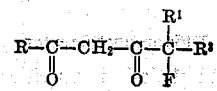

wherein R is a member of the group consisting of alkyl, aryl, aralkyl, alkaryl, and heterocyclic radicals and $R^1$ and $R^2$ are members of the group consisting of hydrogen and fluorine. Of course, the R group may contain various substituents such as halogen groups and nitro groups. It is preferred that $R^1$ and $R^2$ are both fluorine atoms, and examples of such a class of compounds are:

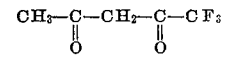

Trifluoroacetylacetone

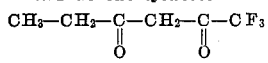

Propionyltrifluoroacetone

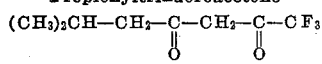

Isovaleryltrifluoroacetone

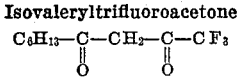

Heptanoyltrifluoroacetone

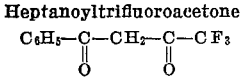

Benzoyltrifluoroacetone

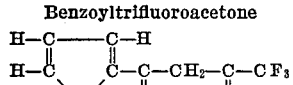

2-thenoyltrifluoroacetone

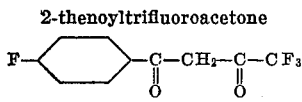

p-Fluorobenzoyltrifluoroacetone

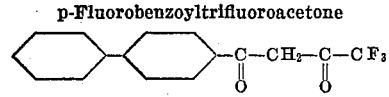

p-Phenylbenzoyltrifluoroacetone

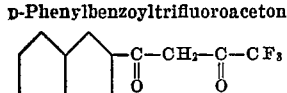

β-Naphthoyltrifluoroacetone

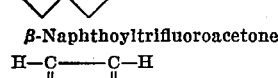

2-furoyltrifluoroacetone

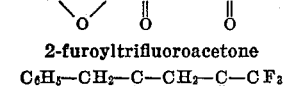

Phenylacetyltrifluoroacetone

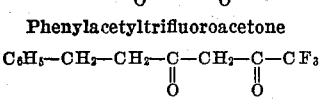

3-phenylpropionyltrifluoroacetone

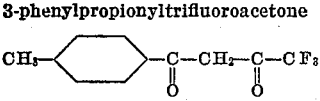

p-Methylbenzoyltrifluoroacetone

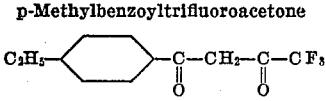

p-Ethylbenzoyltrifluoroacetone

Examples of suitable fluorinated β-diketones containing less than three fluorine atoms are:

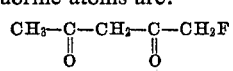

Fluoroacetylacetone

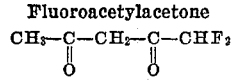

Difluoroacetylacetone

The efficiency of chelation-extraction is not the same for all; e. g., using trifluoroacetylacetone as unity, the following relative concentrations of some of the other β-diketones are necessary for equivalent chelation-extraction: one for 2-furoyltrifluoroacetone; one-third for propionyltrifluoroacetone; one-fifth for isovaleryltrifluoroacetone; one-seventh for benzoyltrifluoroacetone; and one-fifteenth for 2-thenoyltrifluoroacetone.

The organic solvent for the chelating agent of the present invention is a nonpolar substantially water-immiscible organic compound, which is liquid at the temperature of carrying out the process. Examples of suitable types of organic solvents are aromatic hydrocarbons, halogenated aromatic hydrocarbons and halogenated paraffinic hydrocarbons. Specific examples are benzene, toluene, chlorobenzene, hexafluoroxylene, chloroform, carbon tetrachloride, and trichloroethylene. Benzene, toluene, and hexafluoroxylene are the preferred solvents.

Neptunium is present in the aqueous solution as neptunium tetrachloride. The acid present in the aqueous solution is hydrochloric acid and its concentration is between 0.05 and 2 N. The preferred range is between 0.3 and 1 N. The temperature at which the process is carried out may be varied considerably, and the preferred temperature is room temperature. The time of contact between the aqueous solution and chelating agent is preferably greater than fifteen minutes.

The concentration of the chelating agent in the organic solvent may be varied widely, since successful chelation-extraction of neptunium occurred with a chelating agent concentration of 1.86 M and a concentration of less than 0.05 M and since pure chelating agent instead of its organic solvent solution can be used.

For any particular operation the preferred concentration and the total amount of chelating agent will vary with the hydrochloric acid concentration and tetravalent neptunium content of the aqueous solution. The efficiency of extraction is approximately directly proportional to the third power of chelating agent concentration and inversely proportional to the third power of the hydrogen ion concentration.

The ratio of organic solvent solution to aqueous solution may be varied widely, but the preferred range is between 10 to 1 and 1 to 10.

The formal potentials of the couples of neptunium in 1 N hydrochloric acid were determined. The formal potential between trivalent and tetravalent neptunium is —0.14 volt. The formal potentials between tetravalent and pentavalent neptunium and between pentavalent and hexavalent neptunium are —0.74 volt and —1.13 volts, respectively. These values are in volts referred to the hydrogen-hydrogen ion couple as zero and were obtained in 1 N hydrochloric acid. Of course, the pentavalent and hexavalent states of neptunium referred to above are actually the $NpO_2^+$ and $NpO_2^{+2}$ ions. Since the process of the present invention depends upon neptunium being in the tetravalent state, the aqueous solution from which it is chelated and extracted should have an oxidation potential between about —0.15 and —0.7 volt. The preferred range of oxidation potential of the aqueous solution is from —0.5 to —0.6 volt.

Therefor, when neptunium is in an aqueous solution in a valence state greater than +4, it is necessary to reduce neptunium to the tetravalent state before chelation and extraction. This is accomplished by the addition of a reducing agent, such as water-soluble stannous salts, for instance stannous chloride, sulfur dioxide, water-soluble iodides, such as potassium iodide, ammonium iodide, and hydrazine. These compounds have oxidation-reduction potentials in the desired range for reducing neptunium to the tetravalent state and maintaining it in that state. Water-soluble ferrous salts, such as ferrous chloride, in 1 N hydrochloric acid rapidly reduce neptunium from a valence state greater than +4 to the tetravalent state, but only a part of the neptunium is reduced to the tetravalent state probably because the oxidation-reduction potential of ferrous-ferric couple is −0.771 volt in 1 N hydrochloric acid at 25° C. Since ferrous chloride rapidly reduces neptunium, it is preferred to use it as a catalyst for reducing agents, such as stannous chloride, which reduce slowly but completely. The concentration in the aqueous solution of the reducing agent may be between 0.01 and 0.5 M and the preferred concentration is 0.05 to 0.1 M.

The formal potential for iodide-iodine couple in 0.5 N hydrochloric acid is −0.65 volt, whereas the calculated value of the formal potential of the tetravalent neptunium and pentavalent neptunium couple in 0.5 N hydrochloric acid is −0.67 volt. By maintaining a high iodide-iodine ratio in the aqueous solution, essentially complete reduction of pentavalent neptunium to tetravalent neptunium is obtained, and tetravalent plutonium in the same solution is reduced rapidly and completely to trivalent plutonium. The rate of reduction of pentavalent neptunium increases with acid concentration and temperature. Potassium iodide alone in 0.5 N hydrochloric acid is very slow, but potassium iodide plus hydrazine is moderately rapid, in reducing neptunium to the tetravalent state. In general, potassium iodide alone is considerably faster than hydrazine alone as the reducing agent. The hydrazine is used with potassium iodide primarily to reduce liberated iodine so that a high iodide-iodine ratio can be maintained. A very fast reduction rate is attained using a 5 N hydrochloric acid solution containing 0.1 M potassium iodide and 0.05 M hydrazine hydrochloride. Two minutes of heating at 100° C. is sufficient to convert all of the neptunium to the tetravalent state. Where large concentrations of neptunium and plutonium are reduced in 5 N hydrochloric acid, there results a high concentration of free iodine. The hydrazine-nitrogen potential is shifted to such an extent in 5 N hydrochloric acid that it is no longer strong enough to reduce the iodine. Thus, it is necessary to heat the aqueous solution after dilution to an acid concentration suitable for chelation-extraction, such as 0.5 N hydrochloric acid, because the reduction of iodine by hydrazine at room temperature is very slow. This procedure is necessary only when it is desired to have the maximum amount of neptunium in the tetravalent state.

The new compounds of neptunium of this invention are chelate compounds of tetravalent neptunium and the fluorinated β-diketones and are represented by the general formulas:

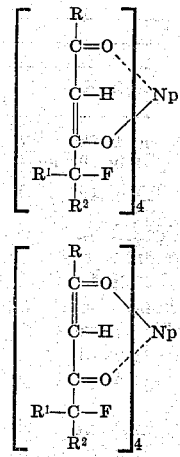

and wherein R, R¹, and R² represent the same groups as indicated above for the general formula of the chelating agent. It is seen that there are two possible formulas for the neptunium chelate compounds, since the β-diketone may enolize in either of two ways. In either case, neptunium is bonded to the oxygen atoms by a covalent bond and a coordinate bond and due to resonance the two compounds would be identical. These compounds are water-insoluble solids, slightly soluble in 0.05–2 N hydrochloric acid, and soluble in benzene, toluene and other nonpolar organic solvents. The solubility of the tetravalent neptunium chelate compound of thenoyltrifluoroacetone in benzene containing 0.06 M 2-thenoyltrifluoroacetone is at least 0.008 M. This neptunium chelate compound is a green, gelatinous material. The neptunium chelate compounds are destroyed by strong acids and acidic aqueous solutions containing agents that form water-soluble complexes. Such agents include oxidizing agents which convert neptunium to a valence state greater than +4. These neptunium chelate compounds may be used to form decorative coatings or to coat foil which can be used in a neutron-detecting ion chamber, where neptunium will fission by neutron bombardment producing β− and γ-radiation that will be detected in the chamber.

In one embodiment of this invention neptunium is separated from an aqueous solution containing a tetravalent neptunium salt by contacting the aqueous solution with an organic solvent solution of a fluorinated β-diketone of the type described above. The aqueous solution contains hydrochloric acid and neptunium is present as neptunium tetrachloride. The acid concentration is that mentioned above along with the ratio of aqueous solution to organic solvent solution and other conditions. The resultant aqueous phase and organic solvent extract phase are separated by settling or centrifugation and the extract phase contains a neptunium chelate compound of the fluorinated β-diketone.

The neptunium may be separated from the organic solvent solution of neptunium chelate compound by contacting the organic solvent solution with a aqueous solution containing a material which converts neptunium of the chelate compound to a water-soluble, organic solvent-insoluble compound, and separating the resultant organic solvent phase and aqueous extract phase containing a neptunium compound. The volume ratios of organic solvent solution and aqueous solution may be varied as in the case of the first extraction. Two types of materials capable of converting neptunium into a water-soluble compound are: strong inorganic acids, such as nitric acid, hydrochloric acid, and sulfuric acid, present in aqueous solution at a concentration of at least 0.1 N and having a substantially greater acidity, for example, at least 0.2 N more acid, than the aqueous extracted solution, and preferably at least 4 N in the case of nonoxidizing acids, e. g., 5 to 10 N in the case of hydrochloric acid, and at least 1 N in the case of an oxidizing acid, such as nitric acid; and oxidizing agents, such as water-soluble ceric salts, potassium dichromate, and potassium bromate in acidic aqueous solutions. Since nitric acid will oxidize neptunium to a valence state greater than +4, its preferred minimum concentration is less than in the case of nonoxidizing strong inorganic acids, as pointed out above. By oxidation, the neptunium is converted to a valence state which does not form sufficiently stable chelate compounds with the fluorinated β-diketones and thus the major portion of the neptunium is extracted by the aqueous solution. The amount of oxidizing agent when used may be varied considerably and a suitable concentration is 0.01 to 1 M. Of course, the amount of oxidizing agent is preferably no more than several times the stoichiometric amount required to oxidize neptunium, so that the amount of oxidation of chelating agent is minimized.

In the second embodiment of the present invention neptunium is separated from its mixture with uranium and fission products by dissolving a mixture of their hydroxides in concentrated hydrochloric acid, i. e., acid having a concentration of at least 3 N, adding a reducing agent to convert the neptunium from a valence state of greater than +4 to the tetravalent state, and leaving uranium in the hexavalent, i. e., uranyl, state, diluting with water to provide an acid strength of from 0.05 to 2 N, contacting this aqueous solution with an organic solvent solution of a chelating agent of the type described above, and separating the resultant aqueous and organic solvent extract phases. The concentration of acid in the aqueous solution, the volume ratio of organic solvent to aqueous solution and the other conditions are those referred to above.

The reduction is preferably carried out at an elevated temperature, and in the case where potassium iodide is used as reducing agent, hydrazine hydrochloride is present to reduce iodine formed, so that it will not be present to oxidize the tetravalent neptunium. Also, when the preferred mixture of potassium iodide and hydrazine hydrochloride is used, the aqueous solution after reduction and dilution is heated to insure complete conversion of iodine to the iodide ion.

In another embodiment of this invention neptunium is separated from its aqueous solution by contacting the aqueous solution with a chelating agent of the type specified above in the absence of an organic solvent. If sufficient fluorinated $\beta$-diketone is used, and since the temperature of operation is above the melting point of the $\beta$-diketone, the $\beta$-diketone acts as a solvent for the neptunium chelate compound. When smaller amounts of fluorinated $\beta$-diketone are used the substantially water-insoluble neptunium chelate compound will precipitate from the aqueous solution and it may be separated by any suitable means, such as filtration or centrifugation.

Another embodiment of the present invention is the separation of neptunium from plutonium present in a mixture of their hydroxides or oxides by dissolving said mixture in concentrated hydrochloric acid, adding a reducing agent to reduce neptunium from a valence state greater than +4 to the tetravalent state and to reduce plutonium from the tetravalent to the trivalent state, diluting the resultant solution to provide a hydrochloric acid concentration of 0.05 to 2 N, maintaining neptunium in the tetravalent state and plutonium in the trivalent state, contacting the aqueous solution with a chelating agent or with an organic solvent solution of the chelating agent of the type specified above, and separating the resultant aqueous solution and neptunium chelate compound or organic solvent extract phase. The volume ratio and other conditions are the same as in the foregoing embodiments.

Another embodiment comprises separating neptunium from an organic solvent solution of a neptunium chelate compound of the fluorinated $\beta$-diketones described above. The process of this embodiment is described in the first embodiment in conjunction therewith as a complete extraction and re-extraction process.

The following examples taken alone and in combination illustrate the embodiment of this invention.

EXAMPLE I

Three-tenths milliliter of 10 N hydrochloric acid solution containing the chlorides of tetravalent $Pu^{239}$ and pentavalent $Np^{239}$ and $Np^{237}$ was mixed with 0.2 ml. of 1 M sulfur dioxide aqueous solution to provide 0.5 ml. of 6 N hydrochloric acid containing 0.4 M sulfur dioxide and the chlorides of plutonium and neptunium. This solution was heated to accelerate the reduction by sulfur dioxide of most of the plutonium and neptunium to the trivalent and tetravalent states, respectively. After heating, the solution was diluted with water to a final volume of 10 ml. The diluted solution was 0.3 M in hydrochloric acid, 0.02 M in sulfur dioxide, 0.0025 M in tetravalent $Np^{237}$ and contained a trace of tetravalent $Np^{239}$. The amount of $Np^{239}$ was 0.00007% of the amount of $Np^{237}$ and was present to determine chelation-extraction of $Np^{237}$ by analyzing aliquots of the aqueous phases for $Np^{239}$ content using a Geiger counter.

The 10 ml. solution was contacted for a total of twenty-five minutes with 5 ml. of 0.05 M 2-thenoyltrifluoroacetone solution in benzene. The volume of the resultant benzene phase was only 4.6 ml., since some of the benzene was lost by evaporation. An aliquot (0.109 microliter) of the aqueous phase was analyzed. The beta counts per minute were subtracted from the beta counts per minute for the same volume of the starting aqueous solution and the distribution coefficient calculated therefrom.

The aqueous phase from the preceding extraction was contacted with 5 ml. of 0.1 M 2-thenoyltrifluoroacetone solution in benzene for forty minutes and 0.109 microliter of the aqueous phase was analyzed for beta counts per minute and the distribution coefficient was calculated.

The aqueous solution from the second extraction was contacted for forty-five minutes with 5 ml. of 0.15 M 2-thenoyltrifluoroacetone solution in benzene. The distribution coefficient was calculated from the analysis of 0.109 microliter of the resultant aqueous phase.

The aqueous phase from the third extraction was contacted with 5 ml. of 0.2 M 2-thenoyltrifluoroacetone solution in benzene and 0.109 microliter of the resultant aqueous phase was analyzed. The distribution coefficient was calculated from this analysis.

The aqueous phase from the preceding extraction was contacted with 5 ml. of 0.2 M 2-thenoyltrifluoroacetone solution in benzene and 1.273 microliters of the resultant aqueous phase was analyzed for the calculation of the distribution coefficient.

In the final extraction of this series 0.336 g. of 2-thenoyltrifluoroacetone was added to the aqueous phase from the preceding extraction and the solution was stirred for about one-half hour. Then 5 ml. of benzene was added and stirring was continued for ten minutes. The distribution coefficient was calculated from the analysis of 1.273 microliters of the resultant aqueous phase.

In all of the foregoing extractions some benzene was lost by volatilization resulting in more concentrated solutions of 2-thenoyltrifluoroacetone than the starting concentrations. These resultant concentrations of ketone in benzene solution are shown in Table I along with the distribution coefficients for the various extractions. These six extractions removed 99.3% of the neptunium from the aqueous solution.

Table I.—Distribution coefficients of tetravalent neptunium between benzene solutions of 2-thenoyltrifluoroacetone and hydrochloric acid

| Ketone concn., M: | Distribution coefficient [1] |
|---|---|
| 0.054 | 0.083 |
| 0.109 | 0.40 |
| 0.167 | 1.78 |
| 0.217 | 4.91 |
| 0.217 | 4.10 |
| 0.3 | 8.60 |

[1] Distribution coefficient is the ratio of neptunium concentrations in benzene and aqueous phases.

EXAMPLE II

The benzene solutions from the extractions in Example I were combined to provide a solution of about 0.025 millimol of $Np^{237}$ in 29.4 ml. of benzene, and the 2-thenoyltrifluoroacetone concentration was about 0.15 M. The benzene solution was contacted for twenty minutes with 2 ml. of 0.31 N hydrochloric acid and 1.273 microliters of the aqueous phase was analyzed for beta counts.

Subsequent extractions were carried out in which sufficient 5 N hydrochloric acid was added to the aqueous phase of the preceding extraction to provide a higher concentration of hydrochloric acid with subsequent contacting of the resultant acid solution with the benzene solution. Contact times ranged from twenty to forty minutes. Due to some loss of benzene by vaporization in each extraction, the ketone concentration increased during each extraction. The ketone concentrations are shown in Table II along with the hydrochloric acid concentration and distribution coefficients. Coefficients were calculated from analysis of 1.273 microliters of the aqueous phase from each extraction. From these analyses and the knowledge of the beta counts per minute per microliter of the original benzene solution, the distribution coefficients were calculated. Beta counts per minute per microliter of the aqueous and benzene phases are also shown in Table II.

Table II.—Distribution coefficients of tetravalent neptunium between benzene solution of 2-thenoyltrifluoroacetone and hydrochloric acid

| Ketone concn., M | HCl concn., N | Beta counts/min./microliter of— | | Distribution coefficient [1] |
|---|---|---|---|---|
| | | Aqueous phase | Benzene phase | |
| 0.170 | 0.31 | 7.9 | 4,656 | 589 |
| 0.172 | 0.59 | 71.5 | 4,697 | 65.7 |
| 0.177 | 0.84 | 225 | 4,836 | 21.5 |
| 0.182 | 1.05 | 478 | 4,938 | 10.3 |
| 0.186 | 1.5 | 1,490 | 4,940 | 3.32 |
| 0.190 | 2.0 | 3,270 | 4,817 | 1.47 |
| 0.191 | 3.0 | 11,500 | 3,172 | 0.276 |

[1] Distribution coefficient is defined below Table I.

Table II shows the marked effect of hydrochloric acid concentration on the distribution coefficient. It is noted that the coefficients in Table II are much higher than those in Table I, possibly due to tetravalent neptunium complexing in Example I by sulfite or bisulfite formed from sulfur dioxide. However, Example I does show sulfur dioxide is a satisfactory, although not preferred, reducing agent.

EXAMPLE III

One and nine-tenths milliliters of an aqueous solution containing pentavalent neptunium as the chloride, namely, $NpO_2Cl$, and hydrochloric acid was contacted for fifteen minutes with 2 ml. of 0.05 M 2-thenoyltrifluoroacetone solution in benzene. Analysis of the aqueous phase showed that pentavalent neptunium is not appreciably extracted, the amount of extraction being less than 5%.

EXAMPLE IV

An aqeous solution for determining dependence of the distribution coefficient upon the 2-thenoyltrifluoroacetone concentration was prepared by dissolving pentavalent neptunium hydroxide, believed to have the formula $NpO_2(OH).xH_2O$, in a solution of 5 N hydrochloric acid, 0.1 M potassium iodide, and 0.1 M hydrazine hydrochloride. Neptunium was reduced by the potassium iodide and the reduction was accelerated by immersing the container holding the solution in a boiling-water bath for two minutes. The solution was then diluted to 0.5 N hydrochloric acid and again immersed in boiling water for two minutes to promote reduction of free iodine by hydrazine. This treatment yielded complete reduction of neptunium to the tetravalent state. The final aqueous solution was about 0.001 M in tetravalent neptunium and portions of it were contacted at room temperature with benzene solutions containing various concentrations of 2-thenoyltrifluoroacetone ranging from 0.01 to 0.5 M. The solutions were agitated at room temperature in glass-stoppered tubes by turning the tubes end over end on a slowly revolving wheel. The glass stoppers were sealed in with a silicone grease to prevent evaporation of benzene. Since the neptunium isotope was $Np^{237}$, the distribution coefficients at equilibrium were determined by alpha assay of 10.32 microliters of the aqueous and benzene phases.

The benzene phases from the extractions using 0.2 and 0.5 M 2-thenoyltrifluoroacetone solutions in benzene were used as stock solutions and were increased in 2-thenoyltrifluoroacetone concentration to provide benzene solutions of neptunium chelate compound and having 2-thenoyltrifluoroacetone concentrations of 0.35, 0.9 and 1.86 M. These benzene solutions containing 2-thenoyltrifluoroacetone and the tetravalent neptunium chelate compound of 2-thenoyltrifluoroacetone were contacted at room temperature with equal volumes of aqueous solution containing 0.5 N hydrochloric acid, 0.01 M potassium iodide, and 0.01 M hydrazine hydrochloride in glass-stoppered tubes by turning the tubes end over end in a slowly revolving wheel overnight (seventeen hours). The neptunium concentrations in the phases were determined by assay of 10.32 microliters of the benzene phases and 50 microliters of the aqueous phases.

The distribution coefficients from the foregoing extractions are presented below in Table III.

Table III.—Distribution coefficients of tetravalent neptunium between benzene solutions of 2-thenoyltrifluoroacetone and hydrochloric acid

| Ketone concn., M | Alpha counts/min./10 microliters of— | | Distribution coefficient [1] |
|---|---|---|---|
| | Aqueous phase | Benzene phase | |
| 0.01 | 1,922 | 74 | 0.0385 |
| 0.02 | 1,395 | 596 | 0.427 |
| 0.04 | 465 | 1,513 | 3.25 |
| 0.075 | 153 | 1,825 | 11.9 |
| 0.2 | 6 | 2,187 | 365 |
| 0.35 | 0.73 | 1,351 | 1,851 |

[1] Distribution coefficient is defined below Table I.

The distribution coefficients for the 0.9 and 1.86 M 2-thenoyltrifluoroacetone systems were so large that it was impossible to get significant assays of the $Np^{237}$ alpha activity in the aqueous phases.

EXAMPLE V

An aqueous phase containing 0.1 M neptunium tetrachloride and hydrochloric acid was contacted with 0.1 M 2-thenoyltrifluoroacetone solution in benzene. A gray precipitate was obtained since the amount of neptunium chelate compound formed was greater than the amount soluble in the benzene phase.

EXAMPLE VI

Several batches of an aqueous solution of pentavalent neptunium chloride and 5 N hydrochloric acid, 0.1 M potassium iodide and 0.05 M hydrazine hydrochloride were boiled for a few minutes to volatilize out the iodine produced. The batches were combined and diluted to 4 ml. to provide a concentration of hydrochloric acid of 0.5 N. Additional potassium iodide and hydrazine hydrochloride were added to maintain their concentrations at 0.1 M and 0.05 M, respectively. The solution was heated a few minutes to reduce free iodine and then contacted for twenty-five minutes with 4 ml. of 0.06 M 2-thenoyltrifluoroacetone solution in benzene. The aqueous solution before contacting was 0.0116 M in $Np^{237}$, i. e., the 4 ml. of aqueous solution contained 11 mg. of $Np^{237}$. The aqueous phase from the extraction was contacted with 4 ml. of 0.12 M 2-thenoyltrifluoroacetone solution in benzene. The benzene phases from these extractions were analyzed for alpha counts using 10.32 microliters in each case. In addition, the final aqueous solution was assayed for alpha counts using 1.273 microliters.

The analysis showed that the first benzene phase contained a neptunium chelate compound containing 7.47 mg. of $Np^{237}$. This is 0.008 M neptunium chelate compound concentration in the benzene showing that at least this amount of the chelate compound is soluble in benzene. By means of the two extractions, 10.86 mg. of $Np^{237}$ was removed from the aqueous solution, i. e., the two extractions effected a 98.7% removal. The distribution coefficients were 2.1 and 23.7 for the 0.06 M and 0.12 M 2-thenoyltrifluoroacetone solutions, respectively.

The first distribution coefficient was much less than the value expected from the coefficients in Example IV. This was believed to be due to the presence of higher concentrations of potassium iodide and hydrazine hydrochloride. Thus, it is desirable but not necessary that the concentrations of reducing agents be as low as possible.

The effect of salt concentration on the distribution coefficient was borne out by the fact that an aqueous solution of neptunium tetrachloride containing 1 N hydrochloric acid and 1 M potassium chloride, when contacted with a solution of 2-thenoyltrifluoroacetone in benzene, gave a distribution coefficient of 0.3, whereas an aqueous solution containing neptunium tetrachloride and 1 N hydrochloric acid, when contacted with a benzene solution of the same concentration of 2-thenoyltrifluoroacetone, gave a distribution coefficient of 10.

EXAMPLE VII

When aqueous solutions containing 0.5 N $HNO_3$, 0.1 M hydroxylamine hydrochloride, and a mixture of trivalent and tetravalent plutonium nitrates were contacted with 0.8 M trifluoroacetylacetone in benzene, the distribution coefficients between benzene and aqueous solution of trivalent and tetravalent plutonium were about 0.001 and 45, respectively. These data show that plutonium is extractible as a fluorinated $\beta$-diketone chelate compound when plutonium is in the tetravalent state but not when it is in the trivalent state.

EXAMPLE VIII

One and eight-tenths ml. of an aqueous solution containing 0.6 N hydrochloric acid, neptunium tetrachloride, and 0.003 M plutonium trichloride was contacted with 10 ml. of 0.05 M 2-thenoyltrifluoroacetone solution in benzene and the aqueous phase was again extracted with 5 ml. of 0.05 M 2-thenoyltrifluoroacetone. The benzene phases were combined and extracted with 5.2 ml. of 5 N hydrochloric acid. Analyses showed that the neptunium had been decontaminated with respect to plutonium by a factor of 300, i. e., the amount of plutonium in the 5 N hydrochloric acid solution was about 0.33% of the plutonium content in the original 0.6 N hydrochloric acid solution. This separation cycle resulted in essentially complete recovery of the neptunium in the 5 N hydrochloric acid solution. This was a very satisfactory plutonium decontamination factor and the plutonium content of neptunium can be lowered still further by repetition of the chelation-extraction and re-extraction cycle.

By this method, several milligrams of neptunium, $Np^{237}$, have been purified to the extent that no alpha activity due to $Pu^{239}$ was detectable by the best method of alpha pulse analysis available. The pulse analysis will detect about 0.1% $Pu^{239}$ activity, which is equivalent to 0.001% $Pu^{239}$ by weight.

EXAMPLE IX

Uranyl bromide was dissolved in 5 N hydrochloric acid to provide 1.5 ml. of 0.01 M uranyl bromide. Then 200 microliters of 1 M potassium iodide and 100 microliters of 1 M hydrazine were added. The solution was heated in a 100° C. bath for five minutes. Spectrophotometric analysis showed that there was no reduction of uranium from the hexavalent state, i. e., the $UO_2^{+2}$ ion, to a lower valence state. Further examination after twelve hours at room temperature revealed there was no reduction. This indicates that uranyl ion is not reduced by heating with potassium iodide and hydrazine.

No accurate value for the distribution coefficient of hexavalent uranium between 0.1 M 2-thenoyltrifluoroacetone solution in benzene and 0.5 N hydrochloric acid was obtained, but the values obtained ranged from 0.001 to 0.10, showing that a good separation of neptunium from its mixture with uranium is effected by the process of this invention.

EXAMPLE X

The two benzene phases from the extractions in Example VI were combined to provide 8 ml. of a benzene solution that was 0.09 M in 2-thenoyltrifluoroacetone and contained 10.86 mg. of $Np^{237}$ as its tetravalent chelate compound. This benzene solution was contacted with 2 ml. of 8 N hydrochloric acid. Analysis of the aqueous phase showed that the removal by the hydrochloric acid solution was quantitative.

EXAMPLE XI

Two milliliters of an aqueous solution containing 0.5 M uranyl nitrate, 0.5 N nitric acid, about 0.2 mg. of tetravalent plutonium nitrate per liter, and various fission products as nitrates was contacted with 1 ml. of 1.07 M trifluoroacetylacetone in benzene. After a 30-minute shaking, the phases were separated and analyzed for plutonium, zirconium, and other fission products. Table IV presents the distribution coefficients in benzene and the aqueous solution of the various elements.

*Table IV.—Relative chelation-extraction of tetravalent plutonium and various fission products*

| Element: | Distribution coefficient [1] |
|---|---|
| Zirconium | >75 |
| Plutonium | 26 |
| Columbium | 0.054 |
| Strontium | 0.0077 |
| Yttrium | 0.0071 |
| Cerium (trivalent) | 0.0006 |

[1] Distribution coefficient is defined below Table I.

Thus, most of the fission products are not chelated and extracted. Only zirconium is chelated and extracted. It can be separated from neptunium by contacting the organic solvent solution of their chelate compounds with an aqueous solution of an oxidizing agent in accordance with one of the embodiments, supra, whereby neptunium is oxidized to a valence state greater than +4 and is extracted by the aqueous solution and zirconium remains in the organic solvent solution as the chelate compound. In such a case, it is preferred that the aqueous solution contain only a low concentration of inorganic acid to reduce extraction of zirconium by the aqueous solution.

The examples, presented above, of this invention were batch experiments, but the chelation-extraction step and re-extraction step may be effected by the use of batch, continuous batch, batch countercurrent, or continuous countercurrent methods.

The foregoing illustrations and embodiments of this invention are not intended to limit its scope, which is to be limited entirely by the appended claims.

What is claimed is:

1. A process for the separation of neptunium from an aqueous solution containing neptunium tetrachloride and containing from 0.05 to 2 N hydrochloric acid, which comprises contacting said aqueous solution with a fluorinated $\beta$-diketone having the general formula:

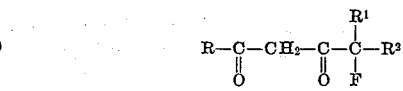

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine.

2. A process for the separation of neptunium from an aqueous solution containing neptunium tetrachloride and containing from 0.05 to 2 N hydrochloric acid, which comprises contacting said aqueous solution with a fluorinated $\beta$-diketone having the general formula:

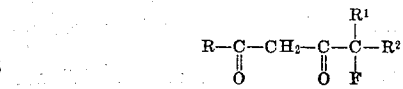

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, and separating from the aqueous solution the resultant neptunium chelate compound of the fluorinated β-diketone.

3. A process for the separation of neptunium from an aqueous solution containing neptunium tetrachloride and containing from 0.05 to 2 N hydrochloric acid, which comprises contacting said aqueous solution with a solution in a nonpolar, substantially water-immiscible organic solvent of a fluorinated β-diketone having the general formula:

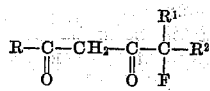

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, and separating the resultant aqueous phase and organic solvent extract phase containing a neptunium chelate compound of the fluorinated β-diketone.

4. The process of claim 3 in which the fluorinated β-diketone is trifluoroacetylacetone.

5. The process of claim 4 in which the organic solvent is benzene.

6. The process of claim 3 in which the fluorinated β-diketone is benzoyltrifluoroacetone.

7. The process of claim 6 in which the organic solvent is benzene.

8. The process of claim 3 in which the fluorinated β-diketone is 2-thenoyltrifluoroacetone.

9. The process of claim 8 in which the organic solvent is benzene.

10. The process of claim 3 in which the hydrochloric acid concentration is between 0.3 and 1 N.

11. A process for the separation of neptunium from an aqueous solution containing a chloride of neptunium, wherein the neptunium valence state is greater than +4, and containing hydrochloric acid, which comprises adjusting the acid concentration to 5 N, adding 0.1 M potassium iodide and 0.1 M hydrazine hydrochloride, heating the resultant solution, diluting the solution tenfold, contacting the resultant solution containing tetravalent neptunium with a solution in a nonpolar, substantially water-immiscible organic solvent of a fluorinated β-diketone having the general formula:

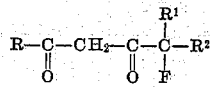

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, and separating the resultant aqueous phase and organic solvent extract phase containing a neptunium chelate compound of the fluorinated β-diketone.

12. A process for the separation of neptunium from an aqueous solution containing neptunium tetrachloride and containing from 0.05 to 2 N hydrochloric acid, which comprises contacting said aqueous solution with a solution in a nonpolar, substantially water-immiscible organic solvent of a fluorinated β-diketone having the general formula:

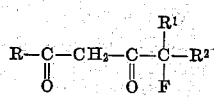

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, separating the resultant aqueous phase and organic solvent extract phase containing a neptunium chelate compound of the fluorinated β-diketone, contacting said extract phase with an aqueous solution containing a material which converts neptunium of said chelate compound to a water-soluble, organic solvent-insoluble compound, said material being selected from the group consisting of hydrochloric acid of a concentration of between 5 and 10 N, nitric acid having a concentration of at least 1 N, ceric compound, dichromate and bromate, and separating the resultant organic solvent phase and aqueous extract phase containing a neptunium compound.

13. A process for the separation of neptunium from an aqueous solution containing neptunium tetrachloride and containing from 0.05 to 2 N hydrochloric acid, which comprises contacting said aqueous solution with a solution in a nonpolar, substantially water-immiscible organic solvent of a fluorinated β-diketone having the general formula:

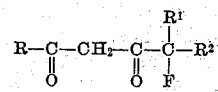

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, separating the resultant aqueous phase and organic solvent extract phase containing a neptunium chelate compound of the fluorinated β-diketone, contacting said extract phase with an oxidizing agent in an acidic aqueous medium, and separating the resultant organic solvent phase and aqueous extract phase containing neptunium in a valence state greater than +4.

14. The process of claim 13 in which the oxidizing agent is potassium dichromate.

15. A process for the separation of neptunium from an aqueous solution containing neptunium tetrachloride and containing from 0.05 to 2 N hydrochloric acid, which comprises contacting said aqueous solution with a solution in a nonpolar, substantially water-immiscible organic solvent of a fluorinated β-diketone having the general formula:

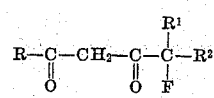

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, separating the resultant aqueous phase and organic solvent extract phase containing a neptunium chelate compound of the fluorinated β-diketone, contacting said extract phase with an aqueous solution containing at least 0.1 N concentration of a strong inorganic acid and having a substantially greater acidity than the aqueous solution extracted, and separating the resultant organic solvent phase and aqueous extract phase containing neptunium.

16. The process of claim 15 in which the fluorinated β-diketone is trifluoroacetylacetone and in which the organic solvent is benzene.

17. The process of claim 15 in which the fluorinated β-diketone is benzoyltrifluoroacetone and in which the organic solvent is benzene.

18. The process of claim 15 in which the fluorinated β-diketone is 2-thenoyltrifluoroacetone and in which the organic solvent is benzene.

19. A process for the separation of neptunium from its mixture with uranium and fission products, said mixture comprising oxides of neptunium, uranium, and fission products, which comprises dissolving the mixture in concentrated hydrochloric acid, adding a reducing agent to convert said neptunium to the tetravalent state and leaving uranium in the hexavalent state, maintaining said neptunium in the tetravalent state and said uranium in the hexavalent state, adjusting the concentration of hydrochloric acid to between 0.05 and 2 N, contacting the resultant solution with a nonpolar, substantially water-immiscible organic solvent solution of a fluorinated β-diketone having the general formula:

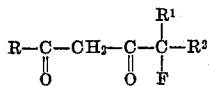

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, and separating the resultant aqueous phase and organic solvent extract phase containing a neptunium chelate compound of the fluorinated β-diketone.

20. The process of claim 19 in which the hydrochloric acid concentration is adjusted to between 0.3 and 1 N.

21. A process for the separation of neptunium from its mixture with uranium and fission products, which comprises contacting an aqueous solution containing neptunium tetrachloride, uranyl chloride, chlorides of fission products and 0.05 to 2 N hydrochloric acid with a nonpolar, substantially water-immiscible organic solvent solution of a fluorinated β-diketone having the general formula:

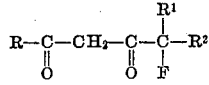

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, separating the resultant aqueous phase containing the uranyl chloride and part of said fission product chlorides from an organic solvent extract phase containing chelate compound of the fluorinated β-diketone of neptunium and some fission product values, and contacting said organic extract phase with an aqueous solution of an oxidizing agent selected from the group consisting of ceric compound, dichromate and potassium bromate whereby said neptunium values are back-extracted while said fission product values remain in the organic solvent extract phase.

22. A process for the separation of neptunium from its mixture with plutonium, said mixture consisting of hydroxides of neptunium and plutonium, which comprises dissolving said mixture of hydroxides in 5 N hydrochloric acid, adding a reducing agent and heating the resultant solution, whereby neptunium is reduced from a valence state greater than +4 to the tetravalent state and tetravalent plutonium is reduced to the trivalent state, diluting the solution to a hydrochloric acid concentration between 0.05 and 2 N, contacting the diluted aqueous solution with a nonpolar, substantially water-immiscible organic solvent solution of a fluorinated β-diketone having the general formula:

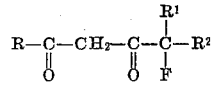

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, and separating the resultant aqueous phase containing trivalent plutonium and organic solvent extract phase containing a neptunium chelate compound of the fluorinated β-diketone.

23. The process of claim 22 in which the fluorinated β-diketone is trifluoroacetylacetone and in which the organic solvent is benzene.

24. The process of claim 22 in which the fluorinated β-diketone is benzoyltrifluoroacetone and in which the organic solvent is benzene.

25. The process of claim 22 in which the fluorinated β-diketone is 2-thenoyltrifluoroacetone and in which the organic solvent is benzene.

26. The process of claim 22 in which the reducing agent is a mixture of potassium iodide and hydrazine hydrochloride.

27. A process for the separation of neptunium from an organic solvent solution of a tetravalent neptunium chelate compound of a fluorinated β-diketone having the general formula:

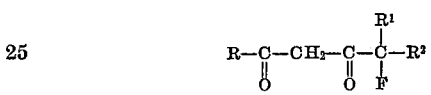

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, which comprises contacting said solution with an aqueous solution containing a material which reacts with said neptunium chelate compound, whereby a water-soluble, organic solvent-insoluble compound of neptunium is formed, said material being selected from the group consisting of hydrochloric acid having a concentration of between 5 and 10 N, nitric acid having a concentration of at least 1 N, ceric compound, dichromate and bromate and separating the resultant organic solvent phase and aqueous extract phase containing a neptunium compound.

28. A process for the separation of neptunium from an organic solvent solution of a tetravalent neptunium chelate compound of a fluorinated β-diketone having the general formula:

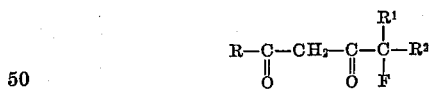

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, which comprises contacting said solution with an oxidizing agent in an acidic aqueous medium, and separating the resultant organic solvent phase and aqueous phase containing a neptunium compound.

29. A process for the separation of neptunium from an organic solvent solution of a tetravalent neptunium chelate compound of a fluorinated β-diketone having the general formula:

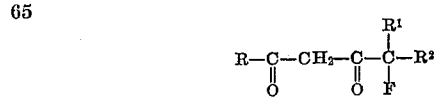

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl and $R^1$ and $R^2$ are members of the group consisting of hydrogen and fluorine, which comprises contacting said solution with an aqueous solution containing at least 0.1 N concentration of a strong inorganic acid, and separating the resultant organic solvent phase and aqueous phase containing tetravalent neptunium as a salt.

30. The process of claim 29 in which the strong inorganic acid is hydrochloric acid and the acid concentration is at least 4 N.

31. The process of claim 29 in which the strong inorganic acid is nitric acid and the acid concentration is at least 1 N.

References Cited in the file of this patent

UNITED STATES PATENTS

| | | |
|---|---|---|
| 2,161,184 | McKone et al. | June 6, 1939 |
| 2,197,498 | Guthmann | Apr. 16, 1940 |
| 2,208,253 | Flenner et al. | July 16, 1940 |

OTHER REFERENCES

Harvey et al.: Journal of the Chemical Society, August 1947, pp. 1010–1021.

UNITED STATES PATENT OFFICE
Certificate of Correction

Patent No. 2,830,066

April 8, 1958

Lawrence B. Magnusson

It is hereby certified that error appears in the printed specification of the above numbered patent requiring correction and that the said Letters Patent should read as corrected below.

Column 2, lines 70 to 73, the formula should appear as shown below instead of as in the patent:

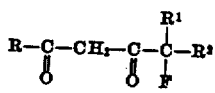

column 5, lines 58 to 66, the formula should appear as shown below instead of as in the patent:

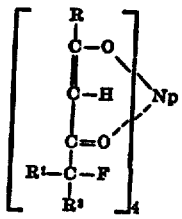

column 11, line 73, for "0.10" read *0.01*.

Signed and sealed this 23rd day of December 1958.

[SEAL]

Attest:
KARL H. AXLINE,
*Attesting Officer.*

ROBERT C. WATSON,
*Commissioner of Patents.*